(12) United States Patent
Buzio et al.

(10) Patent No.: US 6,528,173 B1
(45) Date of Patent: *Mar. 4, 2003

(54) COEXTRUDED MULTILAYER FILMS FOR STERILIZABLE FLUID CONTAINERS

(75) Inventors: Pierpaolo Buzio, Novara (IT); Italo Incollingo, Milan (IT)

(73) Assignee: Baxter International Inc., Deerfield, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,164

(22) Filed: Oct. 23, 1998

Related U.S. Application Data

(63) Continuation of application No. PCT/IB98/00204, filed on Feb. 24, 1998.

(51) Int. Cl.⁷ .............................. B32B 27/08
(52) U.S. Cl. .................. 428/515; 428/35.7; 428/516; 428/517; 428/519; 428/521; 428/523
(58) Field of Search ........................ 428/35.2, 35.7, 428/500, 515, 516, 517, 519, 521, 523, 36.92, 200, 347; 206/0.5, 438; 383/94

(56) References Cited

U.S. PATENT DOCUMENTS

| | | | |
|---|---|---|---|
| 2,705,223 A | 3/1955 | Renfrew et al. ............... 260/18 |
| 3,255,923 A | 6/1966 | Soto ............................ 222/80 |
| 3,375,300 A | 3/1968 | Ropp ......................... 260/857 |
| 3,772,136 A | 11/1973 | Workman ................... 161/169 |
| 3,912,843 A | 10/1975 | Brazier ...................... 428/474 |
| 3,937,758 A | 2/1976 | Castagna ................ 260/876 R |
| 3,995,084 A | 11/1976 | Berger et al. ................ 428/35 |
| 4,005,710 A | 2/1977 | Zeddies et al. .......... 128/214 R |
| 4,041,103 A | 8/1977 | Davison et al. ......... 260/857 D |
| 4,058,647 A | 11/1977 | Inoue et al. ................. 428/474 |
| 4,087,587 A | 5/1978 | Shida et al. ................. 428/500 |
| 4,087,588 A | 5/1978 | Shida et al. ................. 428/500 |
| 4,095,012 A | 6/1978 | Schirmer .................... 428/474 |
| 4,103,686 A | 8/1978 | LeFevre ................. 128/214 R |
| 4,147,827 A | 4/1979 | Breidt, Jr. et al. .......... 428/218 |
| 4,186,240 A | 1/1980 | Matsuda et al. ............ 428/349 |

(List continued on next page.)

FOREIGN PATENT DOCUMENTS

| | | |
|---|---|---|
| EP | 92897 | 2/1983 |
| EP | 0282282 A2 | 9/1988 |
| EP | 446505 A1 | 9/1991 |

(List continued on next page.)

OTHER PUBLICATIONS

Derwent Abstract of JP 404288162A, 1992.*
West Abstract of JP 404288162A, 1992.*
*The Encyclopedia of Chemistry*, Third Edition, Edited by Clifford A. Hampel, Van Nostrand Reinhold Company, New York, pp. 874–876.

Primary Examiner—Sandra M. Nolan
(74) Attorney, Agent, or Firm—Mark J. Buonaiuto; Joseph A. Fuchs

(57) ABSTRACT

A multilayered film exhibiting good transparency, welding resistance, puncture resistance and impact strength having an outer layer selected from the group consisting of: (1) homopolymers of polypropylene, (2) ethylene/propylene copolymers and (3) blends of (a) high density polyethylene and (b) propylene and ethylene block copolymers; an inner layer of a different composition from the outer layer and selected from the group consisting of ethylene and α-olefin copolymers, and ethylene and α-olefin copolymers blended with low density polyethylene; and a complex intermediate layer joining the outer layer to the inner layer, the complex intermediate layer having a plurality of sublayers defining an upper nucleus B1, a core B2 and a lower nucleus B3, the upper nucleus being a propylene and ethylene copolymer and the lower nucleus being an ethylene copolymer with an ethylene content greater than the upper nucleus.

29 Claims, 1 Drawing Sheet

U.S. PATENT DOCUMENTS

| | | | |
|---|---|---|---|
| 4,188,350 A | 2/1980 | Vicik et al. .................. 525/232 |
| 4,207,363 A | 6/1980 | Lustig et al. ................... 428/35 |
| 4,230,830 A | 10/1980 | Tanny et al. ................. 525/222 |
| 4,233,367 A | 11/1980 | Ticknor et al. .......... 428/476.3 |
| 4,244,378 A | 1/1981 | Brignois ...................... 128/766 |
| 4,284,672 A | 8/1981 | Stillman ........................ 428/35 |
| 4,284,674 A | 8/1981 | Sheptak ......................... 428/69 |
| 4,286,628 A | 9/1981 | Paradis et al. ............... 137/843 |
| 4,292,355 A | 9/1981 | Bonis ............................ 428/35 |
| 4,293,608 A | 10/1981 | Isaka et al. .................. 428/220 |
| 4,294,889 A | 10/1981 | Hashimoto .................. 428/515 |
| 4,297,411 A | 10/1981 | Weiner ........................ 428/347 |
| 4,303,710 A | 12/1981 | Bullard et al. ................ 428/35 |
| 4,310,017 A | 1/1982 | Raines ........................ 137/533 |
| 4,311,742 A | 1/1982 | Otsuka .......................... 428/35 |
| 4,311,807 A | 1/1982 | McCullough et al. ........ 525/197 |
| 4,322,465 A | 3/1982 | Webster ....................... 428/194 |
| 4,322,480 A | 3/1982 | Tuller et al. .............. 428/476.1 |
| 4,326,574 A | 4/1982 | Pallaroni et al. ................. 150/8 |
| 4,327,726 A | 5/1982 | Kwong ........................ 128/272 |
| 4,329,388 A | 5/1982 | Vicik et al. .................. 428/216 |
| 4,332,665 A | 6/1982 | Berejka .................... 204/159.2 |
| 4,332,858 A | 6/1982 | Saitoh et al. ................. 428/412 |
| 4,343,852 A | 8/1982 | Isaka et al. .................. 428/216 |
| 4,357,191 A | 11/1982 | Bullard et al. .......... 156/244.14 |
| 4,361,628 A | 11/1982 | Krueger et al. ........... 428/475.8 |
| 4,369,812 A | 1/1983 | Paradis et al. ............... 137/843 |
| 4,370,374 A | 1/1983 | Raabe et al. ................. 428/216 |
| 4,387,184 A | 6/1983 | Coquard et al. ............. 525/183 |
| 4,389,450 A | 6/1983 | Schaefer et al. ............. 428/212 |
| 4,397,916 A | 8/1983 | Nagano ...................... 428/461 |
| 4,405,667 A | 9/1983 | Christensen et al. ........... 428/35 |
| 4,407,873 A | 10/1983 | Christensen et al. ........... 428/35 |
| 4,407,877 A | 10/1983 | Rasmussen .................. 428/105 |
| 4,407,888 A | 10/1983 | Crofts ......................... 428/355 |
| 4,417,753 A | 11/1983 | Bacebowski et al. .......... 285/21 |
| 4,429,076 A | 1/1984 | Saito et al. .................... 525/57 |
| 4,439,478 A | 3/1984 | Ferguson et al. ............ 428/137 |
| 4,461,808 A | 7/1984 | Mollison ................. 428/475.8 |
| 4,467,003 A | 8/1984 | Pallaroni et al. ............... 428/64 |
| 4,467,084 A | 8/1984 | Kitagawa et al. ............ 528/324 |
| 4,477,532 A | 10/1984 | Schmukler et al. .......... 428/441 |
| 4,479,989 A | 10/1984 | Mahal ........................... 428/35 |
| 4,501,798 A | 2/1985 | Koschak et al. ............... 428/34 |
| 4,516,977 A | 5/1985 | Herbert ....................... 604/415 |
| 4,521,437 A | 6/1985 | Storms ........................ 426/130 |
| 4,528,220 A | 7/1985 | Hwo ............................. 428/35 |
| 4,548,348 A | 10/1985 | Clements .................. 229/1.5 H |
| 4,552,714 A | 11/1985 | Krueger et al. .............. 264/171 |
| 4,557,780 A | 12/1985 | Newsome et al. ...... 156/244.11 |
| 4,561,110 A | 12/1985 | Herbert et al. .............. 604/403 |
| 4,562,118 A | 12/1985 | Maruhashi et al. .......... 428/412 |
| 4,568,333 A | 2/1986 | Sawyer et al. ............... 604/122 |
| 4,568,723 A | 2/1986 | Lu .............................. 525/912 |
| 4,588,648 A | 5/1986 | Krueger et al. ........... 428/475.8 |
| 4,599,276 A | 7/1986 | Martini ....................... 428/520 |
| 4,615,922 A | 10/1986 | Newsome et al. ............. 428/35 |
| 4,617,119 A | 10/1986 | Mathieu .................... 210/321.3 |
| 4,627,844 A | 12/1986 | Schmitt ....................... 604/264 |
| 4,629,657 A | 12/1986 | Gulati et al. ................. 428/461 |
| 4,636,412 A | 1/1987 | Field ............................. 428/35 |
| 4,640,870 A | 2/1987 | Akazawa et al. ............ 428/483 |
| 4,643,926 A | 2/1987 | Mueller ......................... 428/35 |
| 4,656,813 A | 4/1987 | Baldini et al. ................. 53/410 |
| 4,683,916 A | 8/1987 | Raiens ........................ 137/854 |
| 4,684,364 A | 8/1987 | Sawyer et al. ............... 604/123 |
| 4,684,576 A | 8/1987 | Tabor et al. ................. 428/441 |
| 4,685,917 A | 8/1987 | Baldini et al. ............... 604/411 |
| 4,686,125 A | 8/1987 | Johnston et al. ............... 428/35 |
| 4,687,688 A | 8/1987 | Curie et al. .................... 428/35 |
| 4,692,361 A | 9/1987 | Johnston et al. ............... 428/35 |
| 4,692,386 A | 9/1987 | Schinkel et al. ............. 428/515 |
| 4,707,389 A | 11/1987 | Ward ............................ 428/36 |
| 4,722,725 A | 2/1988 | Sawyer et al. ................. 604/27 |
| 4,724,028 A | 2/1988 | Zabielski et al. ............... 156/2 |
| 4,726,997 A | 2/1988 | Mueller et al. .................. 428/4 |
| 4,732,795 A | 3/1988 | Ohya et al. .................... 428/36 |
| 4,734,327 A | 3/1988 | Vicik .......................... 428/332 |
| 4,735,855 A | 4/1988 | Wofford et al. ............. 428/349 |
| 4,740,582 A | 4/1988 | Coquard et al. .......... 428/339.3 |
| 4,746,562 A | 5/1988 | Fant ............................ 428/213 |
| 4,753,222 A | 6/1988 | Morishita ....................... 128/4 |
| 4,760,114 A | 7/1988 | Haff et al. ..................... 525/66 |
| 4,764,404 A | 8/1988 | Genske et al. ................. 428/35 |
| 4,767,651 A | 8/1988 | Starczewski et al. .......... 428/35 |
| 4,772,497 A | 9/1988 | Maasola ........................ 428/35 |
| 4,778,697 A | 10/1988 | Genske et al. ................. 428/35 |
| 4,792,488 A | 12/1988 | Schirmer .................... 428/349 |
| 4,795,782 A | 1/1989 | Lutz et al. ..................... 525/66 |
| 4,800,129 A | 1/1989 | Deak ........................ 428/474.4 |
| 4,803,102 A | 2/1989 | Raniere et al. ............. 428/35.2 |
| 4,822,688 A | 4/1989 | Nogues ....................... 428/458 |
| 4,834,755 A | 5/1989 | Silvestrini et al. ............. 623/13 |
| 4,842,930 A | 6/1989 | Schinkel et al. ............. 428/349 |
| 4,851,290 A | 7/1989 | Vicik .......................... 428/334 |
| 4,855,356 A | 8/1989 | Holub et al. ................... 525/66 |
| 4,856,259 A | 8/1989 | Woo et al. ..................... 53/373 |
| 4,856,260 A | 8/1989 | Woo et al. ..................... 53/372 |
| 4,863,996 A | 9/1989 | Nakazima et al. ............. 525/92 |
| 4,871,799 A | 10/1989 | Kobayashi et al. ............ 525/64 |
| 4,873,287 A | 10/1989 | Holub et al. ................... 525/92 |
| 4,877,682 A | 10/1989 | Sauers et al. ................ 428/412 |
| 4,877,684 A | 10/1989 | Shepard .................... 428/475.8 |
| 4,885,119 A | 12/1989 | Mueller et al. ................ 264/22 |
| 4,897,274 A | 1/1990 | Candida et al. .............. 426/127 |
| 4,910,085 A | 3/1990 | Raniere et al. .............. 428/412 |
| 4,911,963 A | 3/1990 | Lustig et al. ............. 428/36.97 |
| 4,915,893 A | 4/1990 | Gogolewski et al. ........ 264/205 |
| 4,923,470 A | 5/1990 | Dumican ...................... 623/11 |
| 4,929,479 A | 5/1990 | Shishido et al. ............ 428/35.2 |
| 4,938,683 A | 7/1990 | Boice .......................... 428/517 |
| 4,940,047 A | 7/1990 | Richter et al. ................ 128/90 |
| 4,943,780 A | 7/1990 | Redding .................... 428/35.9 |
| 4,957,966 A | 9/1990 | Nishio et al. .................. 525/66 |
| 4,957,967 A | 9/1990 | Mizuno et al. ................ 525/68 |
| 4,966,795 A | 10/1990 | Genske et al. ............. 428/34.3 |
| 4,977,022 A | 12/1990 | Mueller ...................... 428/349 |
| 4,977,213 A | 12/1990 | Giroud-Abel et al. ......... 525/66 |
| 4,996,054 A | 2/1991 | Pietsch et al. ............... 424/422 |
| 5,004,647 A | 4/1991 | Shah .......................... 428/349 |
| 5,006,114 A | 4/1991 | Rogers et al. ............... 604/164 |
| 5,006,601 A | 4/1991 | Lutz et al. ..................... 525/66 |
| 5,011,719 A | 4/1991 | Gehrke et al. .............. 428/35.7 |
| 5,017,436 A | 5/1991 | Schwarz et al. ............. 428/519 |
| 5,017,652 A | 5/1991 | Abe et al. ...................... 525/68 |
| 5,034,457 A | 7/1991 | Serini et al. ................... 525/67 |
| 5,034,458 A | 7/1991 | Serini et al. ................... 525/67 |
| 5,053,258 A | 10/1991 | Booze et al. ............... 428/36.6 |
| 5,053,259 A | 10/1991 | Vicik ....................... 428/36.91 |
| 5,053,457 A | 10/1991 | Lee .............................. 525/78 |
| 5,071,686 A | 12/1991 | Genske et al. ............. 428/35.7 |
| 5,071,911 A | 12/1991 | Furuta et al. .................. 525/68 |
| 5,071,912 A | 12/1991 | Furuta et al. .................. 525/68 |
| 5,075,376 A | 12/1991 | Furuta et al. .................. 525/68 |
| 5,077,109 A | 12/1991 | Lustig et al. ............. 428/36.91 |
| 5,079,295 A | 1/1992 | Furuta et al. .................. 525/68 |
| 5,084,352 A | 1/1992 | Percec et al. ................ 428/412 |
| 5,085,649 A | 2/1992 | Flynn ......................... 604/282 |
| 5,093,164 A | 3/1992 | Bauer et al. ................ 428/35.9 |

| Patent No. | Date | Inventor | Class |
|---|---|---|---|
| 5,093,194 A | 3/1992 | Touhsaent et al. | 428/349 |
| 5,094,921 A | 3/1992 | Itamura et al. | 428/520 |
| 5,106,693 A | 4/1992 | Harada et al. | 428/412 |
| 5,108,844 A | 4/1992 | Blemberg et al. | 428/518 |
| 5,110,642 A | 5/1992 | Genske | 428/35.8 |
| 5,114,765 A | 5/1992 | Inada et al. | 428/35.7 |
| 5,114,795 A | 5/1992 | Percec et al. | 428/516 |
| 5,116,906 A | 5/1992 | Mizuno et al. | 525/68 |
| 5,127,904 A | 7/1992 | Loo et al. | 604/83 |
| 5,129,894 A | 7/1992 | Sommermeyer et al. | 604/408 |
| 5,132,363 A | 7/1992 | Furuta et al. | 525/68 |
| 5,145,731 A | 9/1992 | Lund et al. | 482/35.4 |
| 5,154,979 A | 10/1992 | Kerschbaumer et al. | 428/476 |
| 5,159,004 A | 10/1992 | Furuta et al. | 524/390 |
| 5,164,267 A | 11/1992 | D'Heur et al. | 428/474.4 |
| 5,165,919 A | 11/1992 | Sasaki et al. | 424/488 |
| 5,176,634 A | 1/1993 | Smith et al. | 604/87 |
| 5,176,956 A | 1/1993 | Jevne et al. | 128/640 |
| 5,183,706 A | 2/1993 | Bekele | 428/349 |
| 5,185,189 A | 2/1993 | Stenger et al. | 428/34.8 |
| 5,189,091 A | 2/1993 | Laugher | 524/445 |
| 5,194,316 A | 3/1993 | Horner et al. | 428/195 |
| 5,196,254 A | 3/1993 | Akiyama | 428/178 |
| 5,206,290 A | 4/1993 | Mizuno et al. | 525/134 |
| 5,212,238 A | 5/1993 | Schelbelhoffer et al. | 525/66 |
| 5,218,048 A | 6/1993 | Abe et al. | 525/92 |
| 5,230,934 A | 7/1993 | Sakano et al. | 428/35.7 |
| 5,230,935 A | 7/1993 | Delimoy et al. | 428/36.7 |
| 5,238,997 A | 8/1993 | Bauer et al. | 525/66 |
| 5,244,971 A | 9/1993 | Dekoninck | 525/64 |
| 5,258,230 A | 11/1993 | LaFleur et al. | 428/412 |
| 5,278,231 A | 1/1994 | Chundury | 525/66 |
| 5,286,575 A | 2/1994 | Chou | 428/474.4 |
| 5,288,799 A | 2/1994 | Schmid et al. | 525/6 |
| 5,290,105 A | 3/1994 | Tencati | 383/203 |
| 5,290,856 A | 3/1994 | Okamoto et al. | 525/64 |
| 5,306,542 A | 4/1994 | Bayer | 428/192 |
| 5,312,867 A | 5/1994 | Mitsuno et al. | 525/66 |
| 5,317,059 A | 5/1994 | Chundury et al. | 525/66 |
| 5,342,886 A | 8/1994 | Goltin et al. | 525/66 |
| 5,346,773 A | 9/1994 | Simoens | 428/476.9 |
| 5,348,794 A | 9/1994 | Takahashi et al. | 428/213 |
| 5,356,676 A | 10/1994 | von Widdern et al. | 428/34.8 |
| 5,360,648 A | 11/1994 | Falla et al. | 428/35.2 |
| 5,371,141 A | 12/1994 | Gelles et al. | 525/66 |
| 5,378,543 A | 1/1995 | Murata et al. | 428/517 |
| 5,378,800 A | 1/1995 | Mok et al. | 528/349 |
| 5,387,645 A | 2/1995 | Montag et al. | 525/66 |
| 5,462,807 A | 10/1995 | Halle et al. | 428/500 |
| 5,486,387 A | 1/1996 | Mueller | 428/347 |
| 5,489,461 A | 2/1996 | Iwasa et al. | 428/120 |
| 5,500,284 A | 3/1996 | Burgin et al. | 428/349 |
| 5,520,975 A | 5/1996 | Inoue et al. | 428/35.9 |
| 5,523,136 A | 6/1996 | Fischer et al. | 428/35.2 |
| 5,538,804 A | 7/1996 | Ogale | 428/515 |
| 5,616,420 A | 4/1997 | Yamaoka | 428/515 |
| 5,759,648 A * | 6/1998 | Idlas | 428/34.9 |

FOREIGN PATENT DOCUMENTS

| | | |
|---|---|---|
| EP | 0564206 A2 | 10/1993 |
| EP | 0658421 A1 | 6/1995 |
| GB | 2 177 974 A | 2/1987 |
| JP | 404288162 A * | 10/1992 |
| WO | WO83/00158 | 1/1983 |
| WO | WO86/07010 | 12/1986 |
| WO | WO93/23093 | 11/1993 |
| WO | 95/16565 | 6/1995 |

* cited by examiner

COEXTRUDED MULTILAYER FILMS FOR STERILIZABLE FLUID CONTAINERS

RELATED APPLICATIONS

This Application is a continuation of International Application No. PCT/IB98/00204, filed Feb. 24, 1998. International Application No. PCT/IB98/00204 is hereby incorporated by reference, and made a part hereof.

TECHNICAL FIELD

The present invention concerns films, sheets, foils and similar flexible, transparent composites consisting of several coextruded layers having high inter-layer compatibility and adhesion, suitable, in particular for the manufacture, by forming-filling-sealing processes (F-F-S), of containers. Such containers include bags of fluids, particularly of infusional solutions which must be sterilized in an autoclave with steam at about 121° C. or more, and must have, besides transparency and good welding resistance, high resistance to puncture and fall. The films generally comprise at least an outer layer (A), and inner layer (C), and a complex intermediate layer (B) between (A) and (C). The outer layer (A) goes into contact with the soldering means during said F-F-S process and has a melting temperature of at least 130° C. The outer layer (A) also has a high mechanical strength to sustain the filled up container during the sterilization phase. The inner layer (C) is destined to go in contact with said fluids and, once the container is formed and filled up, is responsible of the soldering hot or cold seals. The complex intermediate layer (B) between (A) and (C) is particularly important for the adhesion, transparency, mechanical resistance, and shock absorption of the film. Intermediate layer (B) comprises substantially olefin polymers in absence of adhesives and crosslinking compounds.

BACKGROUND OF THE INVENTION

In patent application (Swiss Pat. Application No. 3771/93, corresponding to EP-A-0658421) is described a multilayer coextruded film substantially of the above type, i.e. having the characteristics indicated as prior Art in the preamble of the present specification and relevant claim 1. In said Application (the description of which is intended to be herein incorporated), the outer layer (A) and the inner layer (C) had the same symmetrical composition (i.e. the same sterilizable polyolefin PO-STERI) whereas the intermediate layer (B), (not sterilizable, with melting point below 121° C. and thickness from 50 to 200 microns) was constituted by polyolefins selected from the group consisting of thermoplastic polyolefins, ethylene-butene copolymers with density below 0.9 g/cm$^3$ and relevant blends. The materials of layers (A and C) (having a thickness from 10 to 80 microns) were selected among: polymers and copolymers of propylene with ethylene and/or butylene; polymers or copolymers of ethylene with an alpha-olefin having six carbon atoms; relevant blends with or without minor amounts of elastomers. The following symbols will be used to indicate: PP, the propylene polymers and PE the ethylene polymers which can be linear (L) and have low (L), medium (M) or high (H) density (D).

In the examples layers (A) and (C) were both and contemporaneously PP or C8-LLDPE (linear, low density polyethylene with small amount of octene, (8)) whereas (B) could be also polyolefinic recovered and regranulated material. Similarly in EP-A-0216506 (classified X i.e. considered relevant in the Search Report of said EP-A-0658421) medical bags are described which are formed by laminates consisting of layers (A) and (C) both equal and selected among LDPE, HDPE or ethylen-alpha olefin copolymers with a density of at least 0.920 g/cm$^3$ whereas (B) is an ethylen-alpha olefin copolymer having density below 0.935 g/cm$^3$. The necessity of having layers (A) and (C) of symmetrical composition was, in general, attributable to the fact that, in so doing it reduced the difficulties of the intermediate layer (B) to confer adequate compatibility and adhesions between said layers (A) and (C) which just because they had a same coposition were already compatible.

The experience has, however, demonstrated that it is neither easy nor sure to confer with a sole layer (even if very thick) of the material of (B) adequate adhesion, particularly after sterilization, to layers (A) and (C) not withstanding their equal composition. Indeed in the case of infusional solution pouches the problems to face are two-fold and concern not only the evaluation and selection of the (A) and (C) couples more suitable, for instance, in terms of viscosity, but also the problems in terms of (f.i.) of the acceptability by the "PHARMACOPEA" for which interlayer adhesion values are to be respected which must be very high and critical, indispensable to guarantee an acceptable behaviour of the structure. There is moreover the current request of bags with always increasing solution volume, which must therefore show resistance characteristics adequately higher.

SUMMARY OF THE INVENTION

The main object of the present invention is that of providing coextruded films and relevant containers having a "maximum maximorum" of characteristics, in particular an optimal combination of excellent values, including the adhesion between terminal layers (A) and (C) of different composition the compatibility, transparency, softness, fall resistance, seal strength, and the absence of transfer of decomposition products in the solutions etc.

This and other objects are reached with the films and related containers having the features recited in the claims. It has indeed been found that by advantageously using layers (A) and (C) of different composition and, between them, a discreet series of substrates B1, B2 . . . Bn critically distributed with gradients as well of their content of combined monomeric ethylene (E) units, as of their melting (softening) temperature, it is possible to obtain films and bags able to satisfy even the most impellent exigencies, including: resistance, machinability, and presentation, etc., in addition to the Pharmacopea specific requirements.

BRIEF DESCRIPTION OF THE DRAWINGS

The different aspects and advantages of the invention will more clearly appear from the following description made with reference to both the examples and the accompanying drawing in which.

DETAILED DESCRIPTION OF THE PREFERRED EMBODIMENTS

Figure 1:
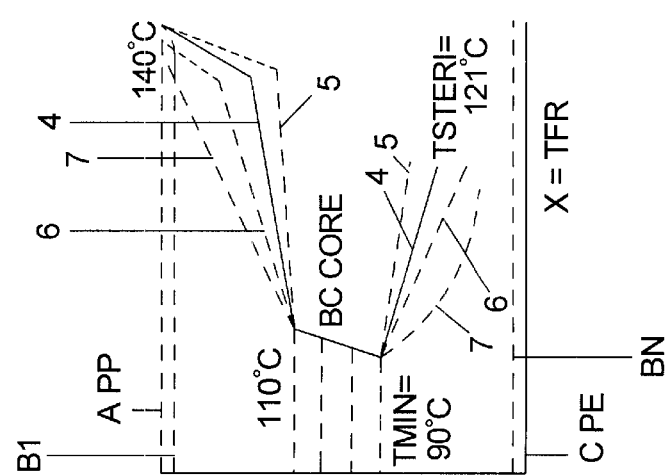
FIG. 1 is a schematic cross section of a multilayer film according to the invention; and, FIGS. 2 and 3 are diagrams which emblematically represent the spatial variation of the ethylene contents, respectively of the melting temperatures in the various layers.

Just to fix immediately the ideas, in FIG. 1, a composite film is represented which comprises, according to a first feature of the invention, two terminal layers (A) and (C) asymmetrical, i.e. of different composition (and characteristics) and a discreet number of "n" intermediate substrates B1, B2 . . . Bi . . . Bn−1, Bn having gradients of ethylene content and of melting or softening temperature (Tfr).

According to an other preferred feature of the invention:
a subnumber "mc" of the central substrates B1 . . . Bmc virtually forming a nucleous or core CO has the minimum softening temperature and gradients of E-content and of softening temperatures minimum or even null;
a subnumber "ms" of substrates from B1 to Bms which virtually form an upper nucleus Bs show increasing ethylene contents and melting temperatures decreasing from the maximal temperature (Tmax) of (A) (about 140° C.) till the minimal temperature (Tmin) lower than the sterilization temperature (121° C. Tster);
a subnumber "mi" of substrates located under the substrates of the core CO, lower nucleus showing still increasing ethylene contents and softening temperatures also increasing from the above mentioned minimum temperature (Tmin; below 121° C.) to the layer (C) temperature (Tc at least equal to the sterilization temperature Tster i.e. 121° C.). Obviously, ms+mc+mi=n.

Figure 2:
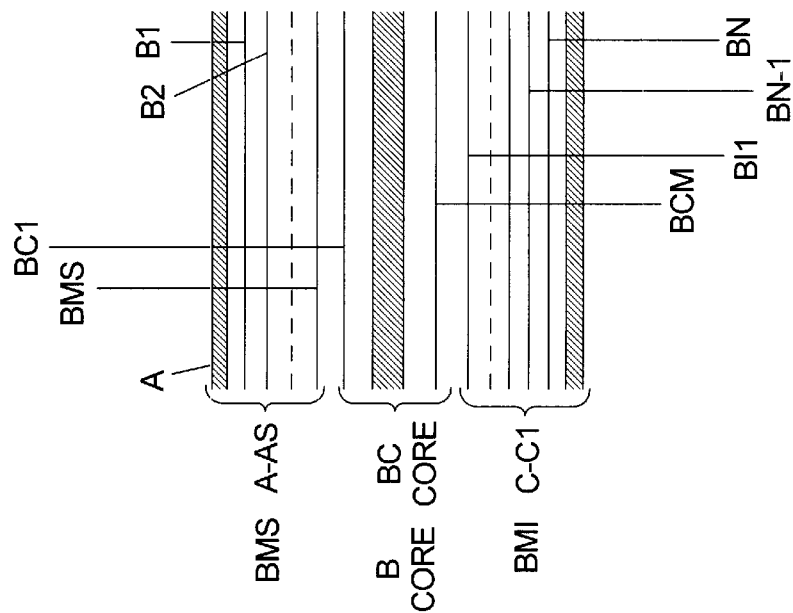

In FIG. 2 are represented the terminal layers (A), (C) and the intermediate layer (B) consisting of a sequence of sublayers (B1, B2 . . . Bn).

Layer (A) consists substantially of combined monomeric units of propylene, possibly with minor quantities of ethylene; preferably (A) is selected between: PP homopolymers with PE low content; in border-line case, it could be also HDPE in admixture with block copolymers PP-PE; layer (C) consists substantially of ethylene combined units possibly with minor quantities of alpha-olefins; preferably (C) is selected between: LLDPE preferably in the form of copolymer with an alpha-olefin mainly octane and, subordinatively, butene, hexene; blends of said LLDPE and a LDPE prepared with high pressure process.

The central layer (B), i.e. the sequence of sublayers (B1, B2 . . . Bn) must show a high affinity with the terminal layers i.e., (A) and (C)) to assure a perfect compatibility and adhesion of the whole structure as well at high temperature as at ambient temperature. Only in this manner it is possible to reach a maximum of the structure mechanical characteristics (including the puncture-and fall-resistances) by involving all the layers in this function of sustain and stress absorption in particular of the deformation.

According to a further feature of the invention, the substrate number is as high as possible however they form preferably successive perfectly compatible couples; this allows to pass through successive stages from the PP kindred face (A) to the PE kindred face (C) by maintaining a perfect cohesion and transparency.

In the practical experience it has been ascertained that if, on one hand, "n" cannot be infinite and, on the other hand, only one substrate of (B) is not sufficient to assure the optimal combination of desired characteristics, particularly satisfactory results begin to appear already with two, better, three substrates possibly repeated several times; with such repetitions one succeeds in creating the sequence of characteristics suitable to optimize the inter-layer adhesion and the homogeneity of the structure.

In said structure (here described with general terms) the parameters which can give an indication of the affinity of the materials present in the successive layers, are the ethylene content (CE) and the softening point even if other primary characteristics are of fundamental importance (crystallinity degree, morphology in the solid state, contact angle etc.). In the practice for the PP-PE copolymers particularly adapted to form the substrates, have been selected the products with increasing ethylene content and for the linear PE have been preferred the products with increasing copolymeric content in order to reach an optimum of adhesion between the two terminals. It has been surprisingly ascertained that there is a good compatibility between the random copolymers richer of ethylene and the so called polyethylenes with very low densities (VLLDPE) and these blends can bring about the term of passage through the structure PP-similar and those more PE-skin. These blends, already obtainable through a simple physical mixing and a successive extrusion, are further improved by a preliminary phase of mixing on the molten mass compounding and are rendered more suitable to the above described use if added with synthetic elastomers such as the polymers SBS, SEBS and the like or with polyolefinic rubbers such as the PP-PE-EPDM copolymers. In the examples some of these structures are reported which have contributed to reach the desired characteristics of interlayer adhesion and of sealing strength, fall-and puncture-resistances, transparency after steam sterilization and machinability requested for the specific use of flexible pouches.

As a further object of the invention concerns the coextruded multilayer structures, in the following examples are reported structures suitable to the planar-head coextrusion called "cast extrusion". Anyway the invention cannot be limited to this technique but can also be embodied by blow coextrusion followed by tubular quenching or sequential coextrusion from separate heads, which allows the extrusion in sucessive steps of different materials which, once cooled, are wound together as a single sheet.

Experimental Part

In one particularly simple embodiment, the structures of the invention have been realized on one cast-coextrusion line consisting of five mono-screw extruders with independent controls, able to melt and feed with good precision up to five different materials with the desired reciprocal flows: the molten materials are then convoied, still separately, to a system layer parallelization and of stabilization of the desired sequences which feed then a flat die for the final formation of the sheet in a molten state.

At the exit of the screw die the sheet is quenched by contact with a rotary cylinder innerly flown by a cooling liquid, and the linear speed of the cylinder in respect to the speed of the outgoing molten mass from the screw die allows to control at will the multilayer structure thickness. The more external layers are possibly provided with sliding or antiblocking conventional agents to improve the machinability of the pouches. With the film samples of the examples, pouches are conventionally formed and filled with infusional solutions and then are sterilized in autoclave at 121° C. and counter-pressure of 2 bar per each total cycle (heating, sterilization and cooling) of 60 minutes. The following structures (particularly the simple structures summarized in Table 1) are manufactured at the same extrusion speed and by maintaining constant the total thickness of 200 microns. The main functional characteristics of the so obtained films are tested and validated according to the conventional methods, 72 hours after the extrusion. The simple materials cited in the Table correspond to the following types and characteristics:

A) PP COPO: random copolymer PP-PE with ethylene content from 3 to 3.5, MFI (melt flow index) measured at 230° C. comprised between 9 and 12; melting point 148–152° C. Typical commercial polymers are: BOREALIS RE 764 or DAPLEN KFC 2004;

B1) PP COPO of high ethylene (content): it is again question of a random PP-PE copolymer but with ethylene high content (7–10%), MFI at, 230° C. of 12) melting point of 132° C. Typical commercial product is DAPLEN MFC 2110 SB;

B2) PP compound: random copolymer with low ethylene content (lower thn 15%) blended and hemogenized with block copolymers of the type SEBS, EPOM. The elastomer content can be between 20 and 30% and the MFI at 230° C. can be between 2 and 8. There is a version totally obtained in the polymerization phase but with similar characterristics called ADFLEX C 200 F made by MONTELL Company.

Figure 3:
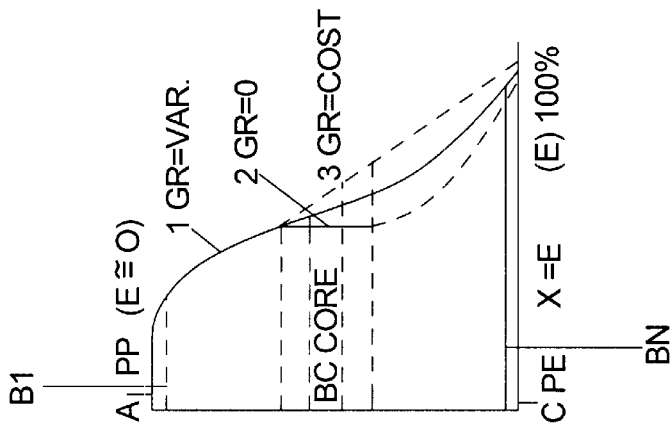

B3) VLLDPE: linear polyethylene with very low density (about 0.900 g/cm$^3$) generally obtained by copolymerizing ethylene with comonomers such as butene, hexene or other alpha-olefins, in the presence of stereospecific catalysts. The product utilized in these tests is "CLEARFLEX" CLDO commercialized by the Company "POLIMERI EUROPA" with a comonomer content below 20%, MFI at 190° C. of 3 and melting point of 115° C.

respectively of the melting-softening temperature (Tfr on axis X of FIG. 3). Significantly the variations of these two important parameters are more marked (stronger) in the two major zones A-As and C-Ci above end below the core CO in which, on the contrary, E and Tfr can vary even in a negligible measure. Gradients of E and Tfr are generally present in said major zones A-AS and C-Ci but they could be minimal or negligible in the central zone CO. In said Figures the dashed curves represent other possible laws of variations of E and Tfr.

From FIG. 2 appears that in the central zone BC the ethylene content E can be constant (curve 2, zero gradient= GR=0) or linearly vary (curve 3, constant gradient GR=cost) or have no linear variations (variable gradient GR=var.). From the foregoing it will observed that numerous variations and modification may be effected without departing from the true spirit and scope of the novel concept of the invention.

TABLE 1

| TEST A | Outer Layer | Intermed. Layer B1 | Intermed. Layer B2 | Intermed. Layer B3 | Inner Layer C | Sealing Strength Kg/15 mm | Delaminat. Force Kg/15 mm | Transparency |
|---|---|---|---|---|---|---|---|---|
| 1 | PP Copo high 55 my | PP Copo high ethylene 15 my | PP Compound/ VLLDPE 15 my | VLLDPE 20 my | LLDPE 95 my | 4.5 | 2.1 | good |
| 2 | PP Copo 60 my | PP Compound 25 my | PP Compound/ VLLDPE 25 my | MDPE 10 my | LLDPE 80 my | 4.9 | 2 | good |
| 3 | PP Copo 55 my | PP Copo high ethylene 25 my | PP Compound 20 my | VLLDPE 15 my | LLDPE 10 my | 4 | 2 | good |
| 4 | PP Copo 55 my | PP Copo high ethylene 25 my | PP Compound 20 my | MDPE 20 my | LLDPE 80 my | 2.7 | 0.5 | not good |
| 5 | PP Copo 55 my | PP Compound 65 my | | | LLDPE 80 my | 2.6 | 1.1 | not good |

C) LLDPE: linear polyethylene (analogous to the above VLLDPE) prepared by stereospecific polymerization of ethylene with small amounts (below 10%) of comonomers of the alpha-olefin type. In a preferred embodiment two further substrates B4 and B5 were added as follows:

B4) MDPE: medium density polyethylene prepared with a conventional process (high pressure) in autoclave and characterized by a relatively high density (d=0.933 g/cm$^3$) which imparts particular stiffness gifts to the film. MFI at 190° C.=2.5–3.5.

B5) LDPE: copolymer with butene or hexene at a parity of all other conditions.

As anticipated, optimal results are obtained by repeating, several times, substrates formed of couples like B1-B2, B2-B3, B3-B4 or of triples like B1-B2-B3, B2-B3-B4, B3-B4-B5 etc.

COMPARATIVE EXAMPLES

In addition to the examples according to the invention, two products are reported in the Table, which have structures not corresponding to those of the invention, (examples 4 and 5) having thus poor properties to confirm that a particular composition is needed to reach the characteristics requested for the specific utilization with pouches.

In the diagrams of FIGS. 2 and 3 are emblematically represented the spatial variations (Y axis) of the content of ethylene combined monomeric units (E on axis X in FIG. 2),

We claim:

1. A multilayered film having good transparency, welding resistance, puncture resistance and impact strength comprising:
   an outer layer selected from the group consisting of: (1) homopolymers of polypropylene, (2) ethylene/ propylene copolymers and (3) blends of (a) high density polyethylene and (b) propylene and ethylene block copolymers;
   an inner layer of a different composition from the outer layer and selected from the group consisting of ethylene and α-olefin copolymers, and ethylene and α-olefin copolymers blended with low density polyethylene; and
   a complex intermediate layer joining the outer layer to the inner layer, the complex intermediate layer having a plurality of sublayers defining an upper nucleus B1, a core B2 and a lower nucleus B3, the upper nucleus being a propylene and ethylene copolymer having a first ethylene content and first melting point temperature and the lower nucleus is of an ethylene copolymer having a second ethylene content and a second melting point temperature wherein the second ethylene content is greater than the first ethylene content and the first melting point temperature is higher than the second melting point temperature.

2. The film of claim 1 wherein the outer layer is an ethylene/propylene copolymer.

3. The film of claim 2 wherein the ethylene/propylene copolymer of the outer layer has an ethylene content of from 3 to 3.5% by weight of the copolymer.

4. The film of claim 3 the ethylene/propylene copolymer of the outer layer is a random copolymer.

5. The film of claim 2 wherein the ethylene/propylene copolymer of the outer layer has a melting point from 148–152° C.

6. The film of claim 2 wherein the ethylene/propylene copolymer has a melt flow index of between 9 and 12 when measured at 230° C.

7. The film of claim 1 wherein the outer layer has a melt softening temperature higher than 121° C.

8. The film of claim 2 wherein the inner layer is a copolymer of ethylene and an α-olefin.

9. The film of claim 8 wherein the copolymer of ethylene and an α-olefin is prepared by stereospecific polymerization.

10. The film of claim 8 wherein the copolymer of ethylene and an α-olefin has an α-olefin content of less than 10% by weight of the copolymer.

11. The film of claim 8 wherein the upper nucleus is ethylene/propylene copolymer having an ethylene content from 7% to 10%.

12. The film of claim 11 wherein the ethylene/propylene copolymer of the upper nucleus is a random copolymer.

13. The film of claim 11 wherein the upper nucleus has melt flow index at 230° C. of 12.

14. The film of claim 11 wherein the upper nucleus has a melting point of 132° C.

15. The film of claim 11 wherein the core is a blend of an ethylene/propylene copolymer and an elastomer.

16. The film of claim 15 wherein the elastomer is selected from the group of SEBS and EPDM.

17. The film of claim 15 wherein the elastomer is present in an amount between 20–30%.

18. The film of claim 15 wherein the elastomer has a melt flow index at 230° C. of between 2 and 8.

19. The film of claim 15 wherein the ethylene/propylene copolymer of the core has an ethylene content of less than 15% by weight of the copolymer.

20. The film of claim 19 wherein the ethylene/propylene copolymer of the core is a random copolymer.

21. The film of claim 15 wherein the lower nucleus is an ethylene and α-olefin copolymer.

22. The film of claim 21 wherein the lower nucleus has a density of about 0.900 g/cm$^3$.

23. The film of claim 21 wherein the α-olefin is selected from the group of butene, hexene or other α-olefins.

24. The film of claim 21 wherein the lower nucleus is obtained using a stereospecific catalyst.

25. The film of claim 21 wherein the α-olefin is present in an amount less than 20%.

26. The film of claim 21 further comprising a first additional substrate B4 in the complex intermediate layer of a medium density polyethylene.

27. The film of claim 26 further comprising a second additional substrate B5 in the complex intermediate layer of a LDPE.

28. The film of claim 26 further comprising in the complex intermediate layer additional sublayers of repeating substrates formed of couples of B1 and B2, or B2 and B3, or B3 and B4.

29. The film of claim 27 further comprising in the complex intermediate layer additional sublayers of repeating substrates formed of triples of B1-B2-B3, or B2-B3-B4, or B3-B4-B5.

* * * * *

UNITED STATES PATENT AND TRADEMARK OFFICE
CERTIFICATE OF CORRECTION

PATENT NO. : 6,528,173 B1
DATED : March 4, 2003
INVENTOR(S) : Pierpaolo Buzio and Italo Incollingo It is certified that error appears in the above-identified patent and that said Letters Patent is hereby corrected as shown below:

<u>Title page,</u>
Item [63], Related U.S. Application Data, please change "Continuation of application No. PCT/IB98/00204, filed on Feb. 24, 1998" to -- Continuation of application No. PCT/IB98/00204, filed on Feb. 17, 1998 --.

Signed and Sealed this

Seventeenth Day of February, 2004

JON W. DUDAS
*Acting Director of the United States Patent and Trademark Office*